United States Patent [19]
Robinson et al.

[11] Patent Number: 5,915,022
[45] Date of Patent: Jun. 22, 1999

[54] METHOD AND APPARATUS FOR CREATING AND USING AN ENCRYPTED DIGITAL RECEIPT FOR ELECTRONIC TRANSACTIONS

[76] Inventors: Rodney Aaron Robinson, 13366 Pastel La., Mountain View, Calif. 94040; Marvin K. Mah, 986 Governor's Bay Dr., Redwood City, Calif. 94065

[21] Appl. No.: 08/657,720

[22] Filed: May 30, 1996

[51] Int. Cl.$^6$ .............................. H04K 1/00; G01R 31/08; G06F 15/16; G06F 3/00
[52] U.S. Cl. ..................... 380/24; 364/225.1; 364/227.3; 364/705.06; 364/709.04; 364/918.1; 380/30; 702/405
[58] Field of Search .................. 380/24, 30; 364/705.06, 364/709.04, 225.1, 227.3, 918.1; 702/405

[56] References Cited

U.S. PATENT DOCUMENTS

| | | | |
|---|---|---|---|
| 5,586,036 | 12/1996 | Pintsov | 380/55 |
| 5,677,955 | 10/1997 | Doggett et al. | 380/24 |

OTHER PUBLICATIONS

B. Schneier, Applied Cryptography, (1st Edition); 1994; John Wiley & Sons, Inc.; pp. 34, 35.

*Primary Examiner*—Stephen C. Buczinski
*Attorney, Agent, or Firm*—Pennie & Edmonds LLP

[57] ABSTRACT

A method and apparatus for authenticating electronic transactions carried out over public networks such as the Internet is disclosed. A transaction record which identifies the electronic transaction to one party, typically a merchant or institution is created. The transaction record is encrypted by a computer controlled by the merchant or institution so as to allow later decryption by the merchant or institution and to prevent alteration by others. A digital receipt is formed by appending the encrypted transaction record to a plaintext message describing the transaction in plaintext. The digital receipt is then communicated to a computer controlled by the customer. The formation of the digital receipt may take place real-time, so that the second party's computer process may remain inactive until the digital receipt is received. The customer may later present the digital receipt to the merchant or institution, who may decrypt the transaction record and compare it to a version previously stored on a database or otherwise authenticate the transaction.

23 Claims, 9 Drawing Sheets

| CUSTOMER NAME | TIME/DATE OF ORDER | DESCRIPTION | QTY | PRICE |
|---|---|---|---|---|

| CONF. NUMBER | CUSTOMER NAME | TIME/DATE | DESCRIPTION | QTY | PRICE |
|---|---|---|---|---|---|

Order Confirmation
Flowers, Inc. Receipt

*Please save this receipt until your order is received. It is necessary in the unlikely case that problems arise.*

Summary of your Order:

Radcliffe Collectible Bear
    Product number: 831W

Base Price ...............$24.95
    Service Charge ........$ 8.95
    Tax .......................$ 1.53
    Total......................$35.43

— 152a

Order date: 05/21/1996

Order time: 07:00:01PST

Ship to address: 10091 Main Street
                  Mountain View, CA 94040

Bill to address: 12999 State Street
                  Los Altos, CA 94022

Visa Credit Card number: 4625 7222 7777 1177

Confirmation number: 188432

150a

<u>Please do not modify below this line. Any modifications will make this receipt null and void and invalidate your guarantee</u>

Electronic Bill pay change confirmation

*Please save this receipt for 60 days. It is necessary in the unlikely case that problems arise.*

Summary of bill pay change:

| | | |
|---|---|---|
| Change date: | 05/20/96 | |
| Change time: | 09:11:31 | —152b |
| Merchant: | Mortgage trust | |
| Pay date: | 10/16/96 | |
| Recurring: | Yes | |
| Period: | The 16th of every month | 150b |
| Amount: | $1261 | |
| Begin date: | 10/16/96 | |
| Confirmation number: | 188433 | |

Please do not modify below this line. Any modifications will make this receipt null and void and invalidate your guarantee A0B1C0A2B3C2A12234B2C0C0C0A2C3A0B1C0A2B3CA1224B2C0C0A2C3A0B1C0A2B3C2A12234B2C0C00A2C3A2
B1C0A2B3C2A12234B2C0C0A2C3A0B1C0A2B3C2A12234B2C0C0A2C3A0B1C0A2B3C2A12234B2C0C0A2C3C2C3
C0A2B3CA1223B2C0C0A2C3A0B1C0A2B3C2A12234B2C0C0A2C3A0B1C0A2B3C2A12234B2C0C0A2C3A5A4AB
A2B3C2A12234B2C0C0A2C3A0B1C0A2B3C2A12234B2C0C0A2C3A0B1C0A2B3C2A12234B2C0C0A2C3A4A2A3A1
B3C2A12234B2C0C0A2C3A0B1C0A2B3C2A12234B2C0C0A2C3A0B1C0A2B3C212234B2C0C0A2C3c3a4a2a0c0d0
C2A12234B2C0C0A2C3A0B1C0A2B3C2A12234B2C0C0A2C3A0B1C0A2B3C2A12234B2C0C0A2C3c3b2a1c2c3b1c2
A12234B2C0C0A2C3A0B1C9A2B3C2A12234B2C0C0A2C3A0B1C0A2B3C2A12234B2C0C0A2C3C4C32C7C1C3C6c3
A10B41C0A2B3C2A12234B2C0C0A2C3A0B1C0A2B3C2A12234B2C0C0A2C3A0B1C0A2B3C2A12234B2C0C0A2C3

Securities purchase order confirmation receipt

*Please save this receipt for 60 days. It is necessary in the unlikely case that problems arise.*

Summary of securities purchase:

| | |
|---|---|
| Purchase date: | 05/21/96 |
| Purchase time: | 09:12:31 |
| Security: | ABC, Inc. |
| Symbol: | ABC |
| Account number: | 878-1099 |
| Account owner: | John Doe |
| Share price: | $110 |
| Shares: | 100 |
| Subtotal amount: | $11,000 |
| Commission: | $49 |
| Total Price: | $11,049 |
| Confirmation number: | 188436 |

—152c

—150c

Please do not modify below this line. Any modifications will make this receipt null and void and invalidate your guarantee

METHOD AND APPARATUS FOR CREATING AND USING AN ENCRYPTED DIGITAL RECEIPT FOR ELECTRONIC TRANSACTIONS

BACKGROUND OF THE INVENTION

1. Field of the Invention

The present invention relates to the field of electronic transactions conducted in a networked computer environment. In particular, the invention relates to a method and apparatus for creating and using trusted digital receipts for electronic transactions.

2. Description for the Related Art

For some time, networked computers have been used for carrying out electronic transactions such as banking, brokerage, trading of financial instruments, and the purchase of goods. Until recently, however, these transactions were performed predominantly on reliable and relatively secure privately controlled networks. For example, a large bank would use a private computer network to connect its fault-tolerant host computer servers to similar computer systems of other large institutions. In general these networks, and the electronic transaction taking place over them, were relatively secure and fault tolerant. Additionally, the parties involved in such transactions were technically sophisticated and ordinarily invested relatively large amounts of time and money in such systems and networks.

Recently, however, it has become possible to use public networks such as the Internet to carry out a wide range of transactional applications implementing banking, brokerage, electronic purchases of hard goods, claim submissions, and other similar functions. For example, it is now possible to purchase goods and services over the Internet and specifically the World Wide Web. Typically a customer locates the merchant's web page, may view product information in the form of advertisements or product descriptions, and proceeds to order goods and services using HTML pages and their Web browser. The customer may opt to pay using conventional financial instruments such as credit cards or debit cards. Merchants or institutions may send an acknowledgement, or even a confirmation number back to the customer in an attempt to assure the customer that the transaction has completed.

The current process of conducting electronic transactions over public networks suffers in a number of ways. Because public networks such as the Internet are inherently less reliable than private networks, failures in such transactions are more common. Further, the technical sophistication of the parties to the transaction is, in general, much lower. For example, merchants and customers transacting over the Internet are much less likely to incur the expense of complex fault-tolerant hardware and software. As a result, it is more common for such users to suffer single-point failures and they are often less capable of recovering from errors originating in their own system or the public network. Thus, due to the relative lack of security in public networks and the decreased likelihood of the use of complex fault-tolerant computer systems for transactions over such networks, failures leading to disputes between the parties are more likely to occur.

The merchant or supplier ordinarily generates and retains some record of the transaction not only so the order can be fulfilled (sending the product or information to the customer, and initiating the billing procedure), but also to aid the merchant in resolving disputes with customers on fulfillment issues, billing issues, or other customer issues with the merchant.

Resolving disputes between merchants and customers is difficult using current network transaction implementations, however, since the customer is at most provided with only a thank-you message or similar acknowledgement. The merchant will ordinarily create and retain his own record of the transaction, which may not be trusted by the customer. Of course the customer could also create and retain their own records, but the merchant may not trust the customer's records since, being in digital form, they are easily modified or forged. Thus, disputes arising from electronic transactions over the Internet are typically difficult to resolve since neither the merchant nor the customer trusts the accuracy of the other's private records.

Further, due to the use of non-fault-tolerant computer systems, problems of merchant data loss are more likely to arise. Additionally, when transacting over public networks such as the Internet, recovery from such problems can be more difficult. For example, if the merchant's computer system fails, transaction records may be lost. In that case the customer's own records may be the only surviving record of the transaction. When the merchant loses transaction data, the merchant may be forced to trust persons who claim to be customers who ordered goods or services.

SUMMARY OF THE INVENTION

The increased likelihood of data failures and disputes between parties when conducting transactions over public networks, and the difficulty in recovering from such failures and resolving such disputes has spawned a great need to provide a method and apparatus for easily authenticating such transactions.

Thus, it has been found desirable to provide a method and apparatus for authenticating electronic transactions carried out over public networks such as the Internet.

It has also been found desirable to provide a digital receipt which can be used as a simple means to authenticate electronic transactions over public networks.

It has also been found desirable to provide all parties to an electronic transaction with a relatively high level of confidence that a digital receipt issued by one party accurately represents information regarding the transaction.

Accordingly, the present invention is directed to a method and apparatus wherein an electronic transaction carried out over a public network is authenticated by creating a transaction record which identifies the electronic transaction to one party, typically a merchant or institution. The transaction record is then encrypted by a computer controlled by the first party such that the first party may later decrypt it and such that no other party can alter it. A digital receipt is formed by appending the encrypted transaction record to a message that describes the transaction in plaintext. The digital receipt is then communicated to a computer controlled by the second party, typically the customer. The formation of the digital receipt may take place real-time, so that the second party's computer process may remain inactive until the digital receipt is received.

Also in accordance with the invention, in the case of a dispute or other failure, the second party may present the digital receipt to the first party. The first party may thereafter decrypt the transaction record and compare it to a version previously stored on a database or otherwise authenticate the transaction.

A method and apparatus having these attributes would therefore be advantageous to a merchant or institution, since it could trust that the encrypted portion had not been tampered with by a customer or other party. The merchant could therefore advantageously provide a guarantee to honor all digital receipts issued within a certain time period. The customer would therefore also benefit from the issuance of the digital receipt.

Additionally, the availability of a simple, low-cost method of authenticating electronic transactions over public networks would facilitate the rapid acceptance in such transactions by attracting more merchants, institutions and customers.

BRIEF DESCRIPTION OF THE DRAWINGS

FIGS. 6a–6c illustrate examples of digital receipt pages according to the invention.

DETAILED DESCRIPTION OF THE INVENTION

Figure 1:
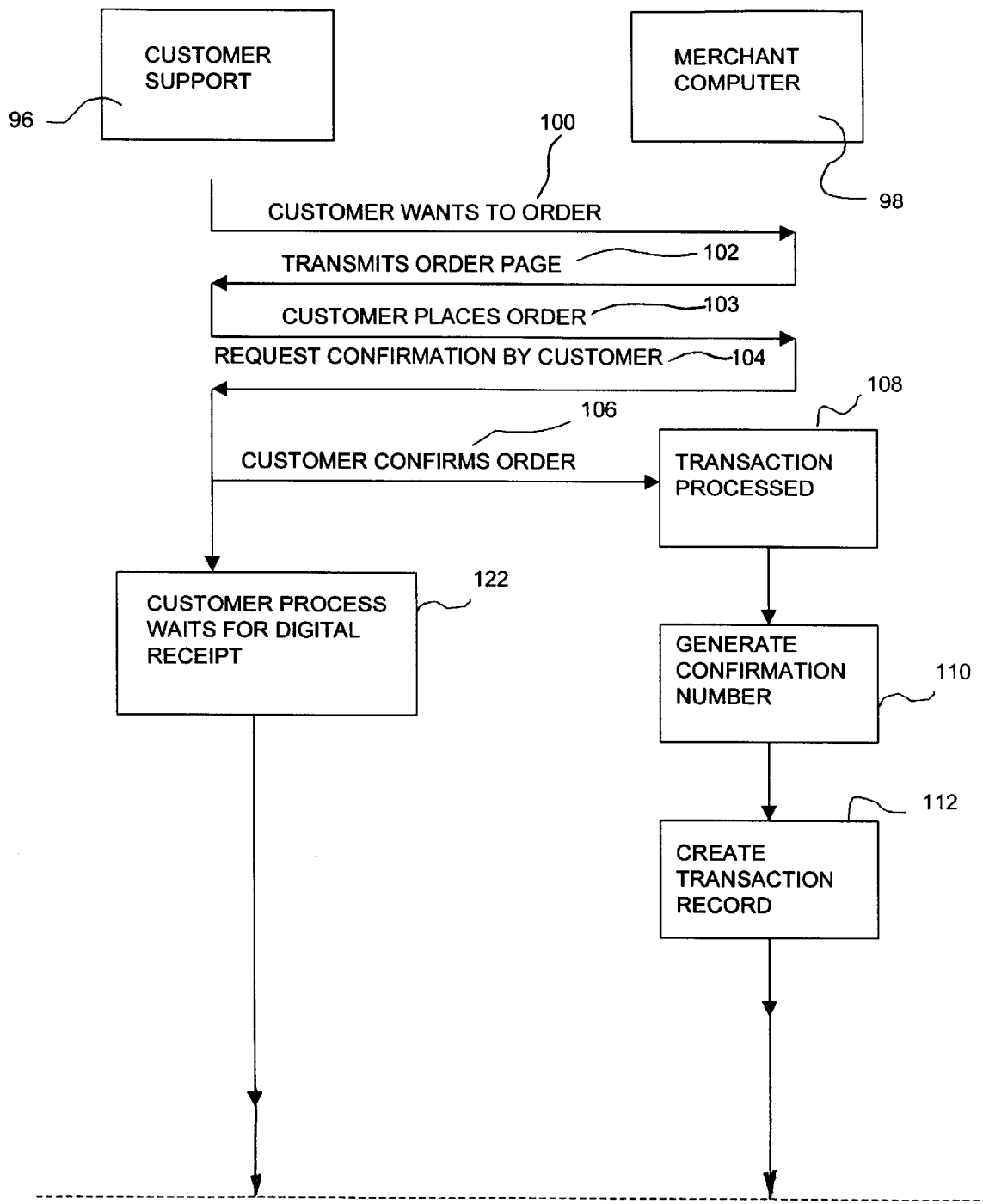
FIG. 1 is a flow chart showing steps for issuing a digital receipt according to the invention.

The following embodiments of the invention will be described in the context of a transaction over the Internet between a customer and a merchant, financial service provider, or similar institution. Those skilled in the art, however, will recognize that the disclosed methods and structures are readily adaptable to broader application. For example, the invention is readily adaptable to other types of remote transactions conducted in a networked computer environment. Note that whenever the same reference numeral is repeated with respect to different figures, it refers to the corresponding structure or step in each such figure.

According to a preferred embodiment of the invention, a flow chart indicating communication between and various steps performed by a customer computer and a merchant computer is shown in FIG. 1. In step 100, customer computer 96 communicates to merchant computer 98 that the customer wishes to place an order. In the case of an electronic transaction over the Internet, a customer, prior to step 100, may have been reviewing product or service information on the merchant's site on the World Wide Web. In response to an indication that customer computer 96 wishes to place an order, merchant computer 98 transmits to customer computer 96 an order page, as shown in step 102. Typically the order page presents a description of the goods or services to the customer, and allows the customer to provide various types of information regarding the transaction such as choosing the type and quantity of the particular good or service, selecting method of payment, and location for delivery.

In step 103, the customer computer places the order with the merchant computer by transmitting the information requested on the order page. Upon receipt of the order information, merchant computer 98 may opt to request that the customer confirm the placement of the order, as shown in step 104. The request in step 104 typically comprises a statement in the form of "Are you sure you wish to place the following order . . . ?", and allows the customer to choose options such as "Place Order" and "Cancel Order". Requesting confirmation by the customer helps to ensure the order was not accidentally or unintentionally placed.

In step 106, the customer confirms to the merchant computer that it wishes to place an order for the specified good or service. Upon receipt of the confirmation of step 106, merchant computer 98 typically proceeds to process the transaction as shown in step 108. For example, where the transaction is for the purchase of goods, the merchant computer may process the transaction by checking inventory and initiating the shipping process, as well as obtaining authorization on the customer's selected form of payment. Alternatively, the processing of the transaction in step 108 may be carried out by a separate process in parallel with the other steps 110–118.

In step 110, merchant computer 98 may opt to generate a confirmation number. A confirmation number is used to uniquely identify the particular transaction. It may simply be a number assigned by a sequential number generator, which is used to identify a particular record stored in a database. On the other hand, the confirmation number may be a unique semi-random number, or derived in some manner from the data of the transaction. It is important, however, that the confirmation number, if used, specifically identifies the transaction to the merchant.

Figures 3A, 3B, 3C:
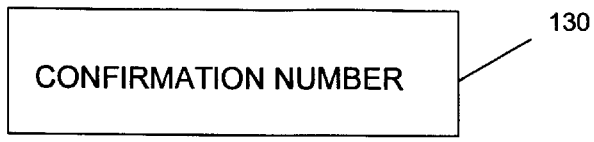
FIGS. 3a–3c illustrate examples of information contained in a transaction record according to the invention.

In step 112 a transaction record is created. The transaction record should be designed to identify the transaction to the merchant computer, or in general, to the merchant himself. In some cases a merchant may simply wish to use a confirmation number which had been generated in step 110. In other cases, however, a merchant may wish to create a transaction record which identifies on its face at least some of the particulars of the transaction. FIGS. 3a3c illustrate some examples of transaction records which may be used. FIG. 3a shows an example of a transaction record 130 which consists only of a confirmation number. One advantage of using only a confirmation number as a transaction record is that the transaction record is relatively short. Since typically the transaction code will be encrypted and appended to a message, a shorter transaction record will result in a shorter encrypted version as well. One disadvantage, however, of using only the confirmation number is that in the event the map or database which links the confirmation number to the transaction particulars suffers a failure, the merchant may be unable to use the confirmation number alone to identify the transaction. Thus, it is preferred that the transaction record contain at least some information that, on its face would identify the transaction to the merchant. Shown in FIG. 3b is one example of such a transaction record. As shown, transaction record 132 comprises various fields for identifying the customer, time of the order, description of the what was ordered, the quantity and the price. In general, however, the information sufficient to identify the transaction to the merchant will depend on the particular setting. For example, the customer name or number may not be required if the date and description, along with other records kept by the merchant, will identify the transaction. An example wherein a confirmation number is used in combination with other information for the transaction record is shown FIG. 3c. Additionally, as would be recognized by those skilled in the art, other information may be added to the transaction record for other reasons without departing from the scope of the invention. Furthermore, as will be discussed in more detail below, if digital signature techniques are used, the transaction record may essentially be a hash total derived from the confirmation message transmitted to the customer.

In step 114, referring again to FIG. 1, the transaction record, including the confirmation number, if used, is stored on a database. Note that as part of processing the transaction in step 108, much of the information regarding the transaction may have already been stored on a database. If this is the case, then one may choose not to store the transaction record, or choose to store only some of information, such as the confirmation number or date and time. However, it is preferred that a copy of the transaction record is stored on the database so that in the case when a customer later presents the encrypted transaction record to the merchant in a dispute, the merchant can decrypt the transaction record and compare it with the version stored on the database.

In step 115, the transaction record is encrypted. Note that the encryption of step 115 is used primarily for the purpose of verification by the merchant. For example, the merchant may need to verify the transaction record in the event of disputes with the customer or in the case when its own transaction record is lost. Thus, if a private-key cryptosystem is used in step 115, it is preferred that the transaction record be decryptable only by the merchant, or someone with authority of the merchant. Conversely, the encrypted transaction record resulting from step 115, is preferably not be decryptable by the customer, since that would compromise the trust of the merchant that the underlying transaction record has not been tampered with.

According to the present invention, the presently preferred method of encryption is triple DES using a 64-bit key. It has been found that this encryption algorithm provides a level of security which is suitable for use with a wide range of transaction scenarios. In general, however, the method of encryption is a design choice which depends on the amount of financial exposure, the likely hood of disputes, and the cost and time necessary to perform each method of encryption. For example, a public-key cryptographic system such as that commonly provided by RSA may be suitable. Other potentially suitable methods of encryption are DES, double DES, MD5, or any other trusted cryptosystem. Furthermore, as will be discussed below in more detail, digital signature technology could be used, having the merchant apply this technology at receipt generation time.

In the case where a public key cryptosystem is used in step 115, it is preferred that the merchant use its own secret key so that no other party may re-encrypt an altered version of the transaction record. If the merchant's own secret key is used to encrypt the transaction record in step 115, then the merchant need not keep the corresponding public key private. If a customer obtains the merchant's public key, for example, the customer could decrypt the transaction receipt, but would still be unable to re-encrypt an altered version of the receipt without the merchant's secret key. Alternatively, the merchant could use its public key for encryption in step 115, so long as the public key is not distributed.

In steps 116 and 118 of FIG. 1 a digital receipt page is created. Examples of digital receipt pages are shown in FIGS. 6a–6c. Shown in FIG. 6a, is an example of a digital receipt page for a transaction involving the purchase of goods. Digital receipt page 150a comprises a confirmation message 152a which is understandable to the customer. Confirmation message 152a is shown to contain a summary of the transaction including a description of the goods ordered, the price, date, time, and information regarding billing and delivery. By providing a description of the transaction, the customer may have a permanent record of the transaction.

According to the invention, the encrypted transaction record is also appended onto the confirmation message. As shown in FIG. 6a, the encrypted transaction record 154a is appended to confirmation message 152a in the lower portion of digital receipt page 150a. Note that since the encrypted transaction record 154a should not be decryptable by customer computer 96, the encrypted transaction record appears as an unreadable code to the customer.

Similarly, FIGS. 6b and 6c show examples of digital receipt pages for transactions involving electronic bill paying, and the purchase of securities, respectively. Note that although the digital receipt page may take many forms, it is desirable to in some manner identify the unreadable encrypted transaction record to the customer, so the customer knows that he should save it in case of a later dispute.

Although step 116 of FIG. 1 shows the creation of a confirmation message just prior to step 118, the creation of the confirmation message may in general be created at any point prior the step 118 wherein the encrypted transaction record is appended to the confirmation message. For example, the confirmation message may be created by a separate process in parallel to the creation of the transaction record, since the confirmation message may contain much of the same information as the transaction record.

Referring again to FIG. 1, in step 120 the encrypted transaction record, which ordinarily is appended to the digital receipt page, is transmitted back to the customer. According to the preferred embodiment of the invention, note that in step 122, the process of customer computer 96 is preferably caused to wait from the time it confirms the order to merchant computer 98 (in step 106), until customer computer 96 receives the confirmation page 120. During the waiting period customer computer 96 may implement a polling process or may be interrupt driven. Alternatively, if the transaction is being carried out using HTML on the Internet, the merchant computer may simply withhold from the customer computer the data from the digital receipt page, thereby causing the customer computer to wait. Note that causing the customer's process to wait is desirable, according to the invention, since electronic transactions using networked computers are typically carried out real-time. For example, during a World Wide Web based transaction, the customer's browser should wait until the digital receipt is received from the merchant's server. The customer wait shown in step 122 of FIG. 1 is implemented by the browser waiting for a response back from the server. While in practice the customer could stop communication with the merchant's server prior to fully receiving the digital receipt page, it is preferred that the customer refrain from doing so.

Finally, in step 126, the customer preferably saves the confirmation page along with the encrypted transaction record appended thereto. As will be explained in further detail with respect to FIG. 5, if the customer saves the confirmation page, he may later present it to the merchant in the event of a dispute over the transaction.

The embodiments described with reference to FIG. 1, are illustrative of how the invention may be implemented in various types of electronic transactions. The sale of goods over the World Wide Web provides one example of electronic transactions to which the invention is applicable. In the case of the sale of goods, a merchant, for promotional reasons, may offer substantial discounts for late deliveries. Using a digital receipt in accordance with the invention, the merchant may issue a digital receipt to a customer, and advise its customers to save the digital receipt in case of disputes or problems with the order. By using digital receipts, the merchant is able to easily verify the exact time the order was placed and whether or not a particular delivery was late.

In another preferred embodiment, the merchant computer 98, rather than transacting goods or services, may represent a financial institution such as a bank, or may represent a broker or trader of financial securities. This embodiment may also be understood by referring to FIG. 1. According to such an embodiment, in the step 108, the processing of the transaction may consist of actually buying or selling the financial security as well a actually debiting or crediting the customers bank or credit account. For example, a customer may purchase stock from a broker for a given price, and at a given time using the World Wide Web. In accordance with the invention, the customer is issued a digital receipt at the time the transaction takes place. If, for example, 30 days later the broker has no record of the transaction, the customer presents the digital receipt to the broker. As will be discussed below, the broker is able to verify the receipt and thereby honor the transaction.

The present invention also is applicable to electronic bill-payment transactions. For example, a consumer using an electronic bill-payment service may change an attribute of the bill-payment service over the Internet. If at the end of the month the consumer learns that the service provider failed to implement the bill-pay change, and a digital receipt had been issued in accordance with the present invention, then the customer may resolve the dispute by presenting his digital receipt to the bill pay service provider.

In a similar fashion, the present invention may be applied to other types of electronic transactions such as tax payment. For example, institutions such as the Internal Revenue Service could issue digital receipts in accordance with the present invention, so that disputes over payment of taxes and filings of returns could be verified easily.

Thus, in general, the terms "customer" and "merchant" as used herein, may refer to any two parties to a real-time electronic transaction implemented in a public network environment, wherein the "merchant" issues a digital receipt to the "customer", and the "merchant" is later able to verify the validity of the receipt. Additionally, the merchant computer 98 referred to herein, may in fact be operated not directly by the merchant but rather by an electronic transaction service provider in close cooperation with and under the authority of the merchant.

Figure 4:
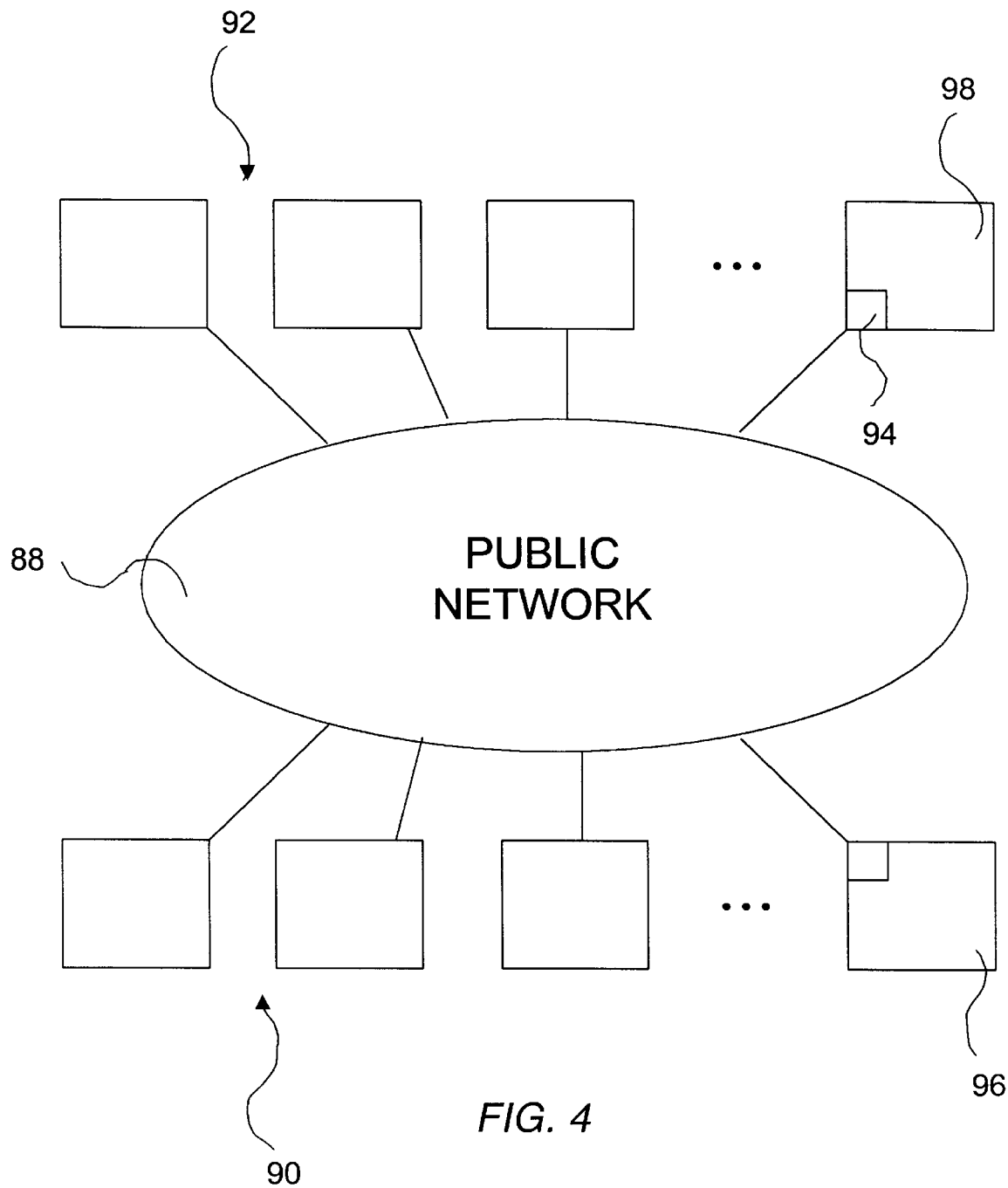
FIG. 4 illustrates an example of a public network environment, according to the invention.

FIG. 4 illustrates an example of a public network environment. As shown, attached to public network 88 are a number of customer computers 90, including customer computer 96, and a number of merchant computers 92, including merchant computer 96. Note that in the case of the Internet, the public network is itself comprised of a large number of nodes. Also shown in the case of merchant computer 98 is a network access device which in general comprises the necessary hardware and software for computer 98 to communicate with other nodes connected to network 88. In this way merchant computer 98 and customer computer 96 are both connected to and communicate over public network 88.

In the example of an Internet transaction, the communication shown in FIG. 1 could be implemented based upon the hypertext conventions of the World Wide Web. In particular the HyperText Markup Language ("HTML") document format may be used so that the windows and pages are compatible with various Internet browser applications. In the case of an Internet transaction, customer computer 96 and merchant computer 98 would use Hypertext Transfer Protocol ("HTTP") to facilitate communications, and documents could be named using Uniform Resource Locators ("URLs") in the network of computers. In an alternative embodiment of the invention, JAVA dialogue boxes or input forms could be used instead of HTML pages. After the user confirms its order, the JAVA input form or dialogue box would wait until the digital network transaction receipt is received from the server.

Figures 1, 2:
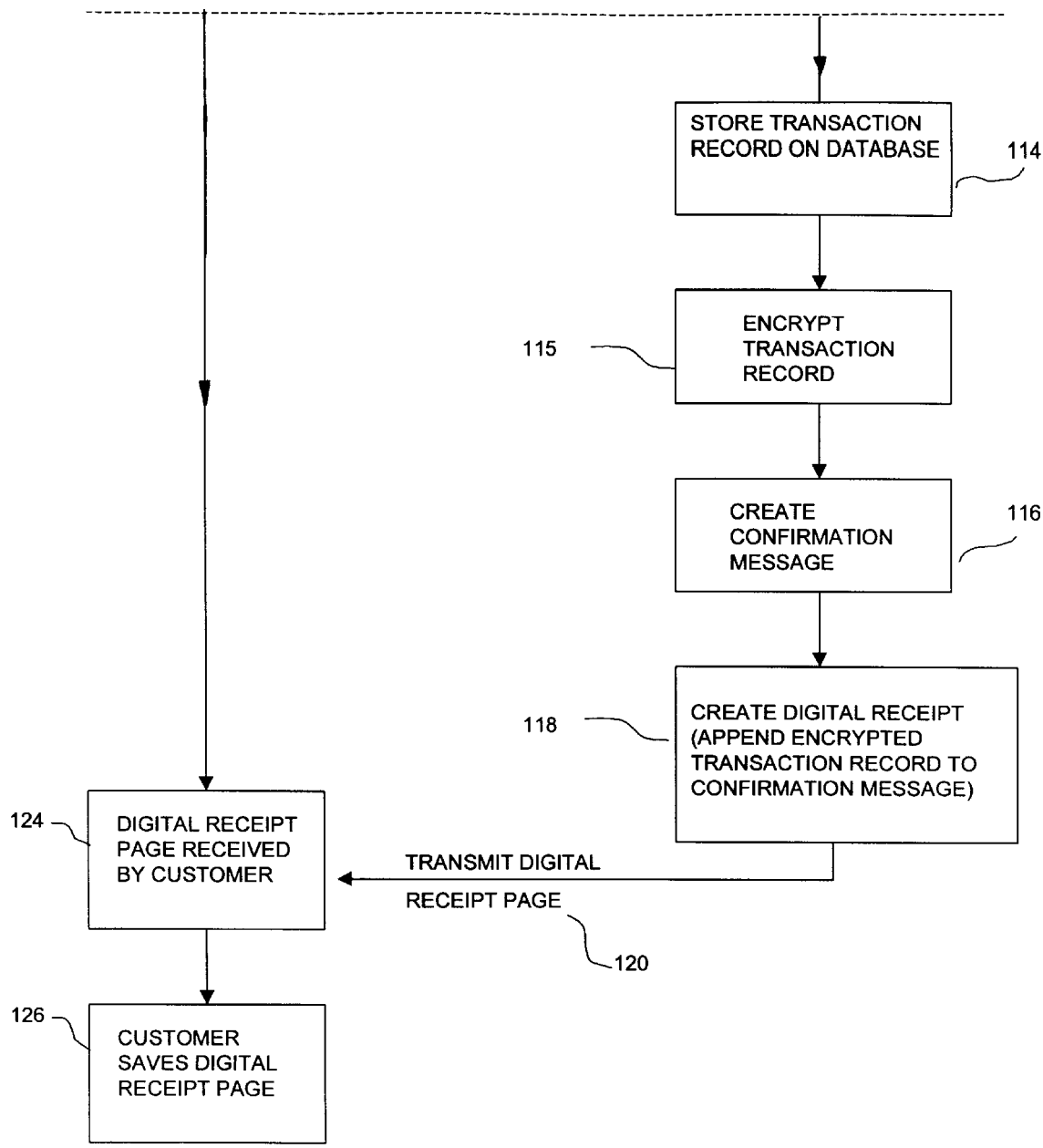
FIG. 2 is a flow chart showing steps for using digital signature techniques to create a digital receipt, according to the invention.
Figure 2:
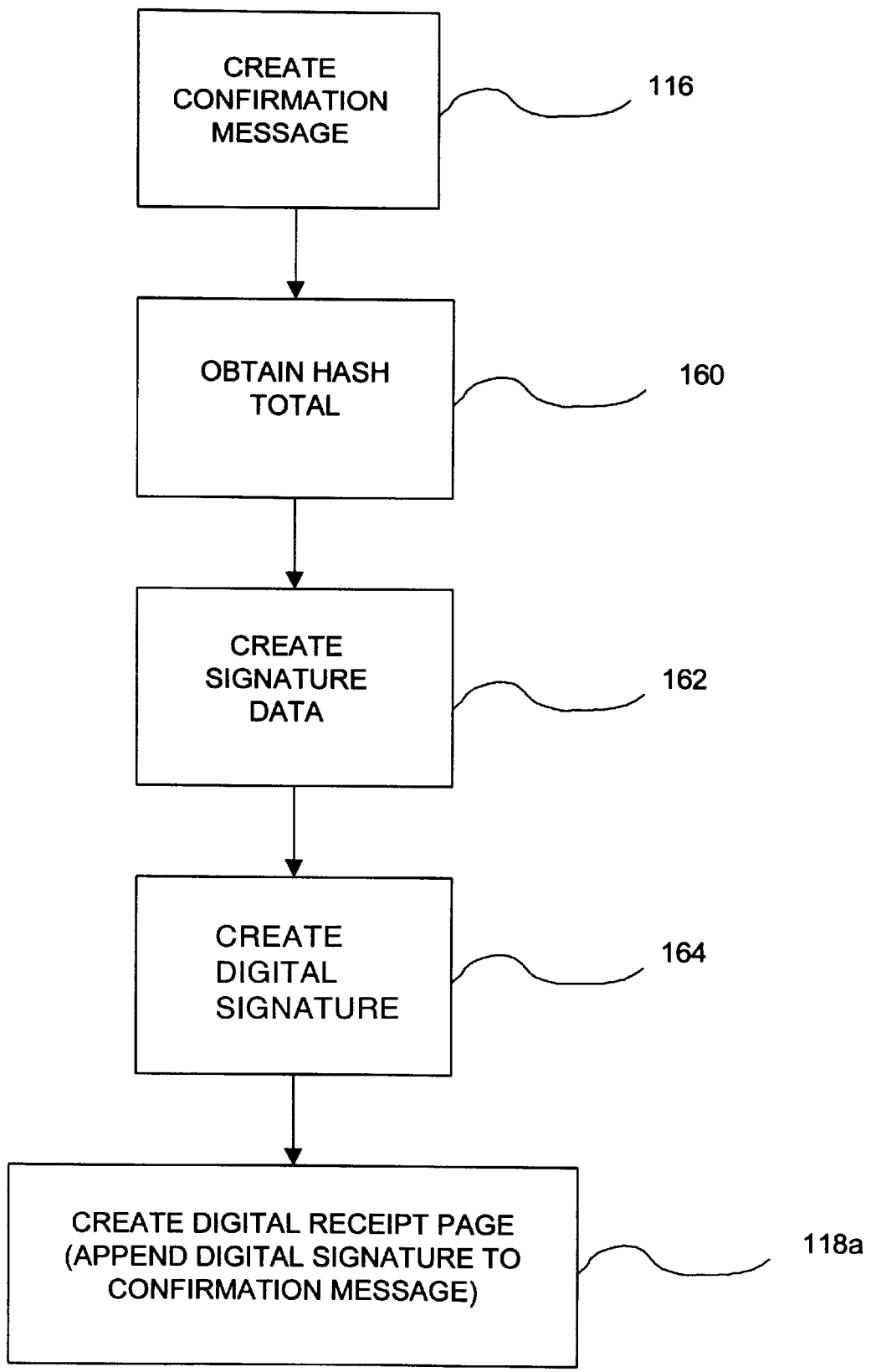

In a further alternative embodiment, digital signature techniques could be used to encrypt and create a digital receipt, as illustrated in FIG. 2. As shown, after the confirmation message is created in step 116, a hash total is obtained in step 160, ordinarily by using a predetermined hash function as a one way function. In step 162, signature data is constructed by a hash total of the confirmation message and personal information of the merchant (for example, the merchant's name). In step 164 a digital signature is created by encrypting the signature data by using the merchant computer's secret key. In step 118a the digital receipt page in this case is created by appending the digital signature to the confirmation message. Following step 118a, the digital signature page is transmitted back to the waiting process of the customer computer. Note that in this embodiment, the transaction record need not even be created. If the confirmation message contains sufficient information to identify the particular transaction to the merchant, the confirmation message serves as, in effect, the transaction record. According to this embodiment, it is nonetheless preferred to still store on a database information regarding the transaction whether it be in the form of the confirmation message or the transaction record.

Figure 5:
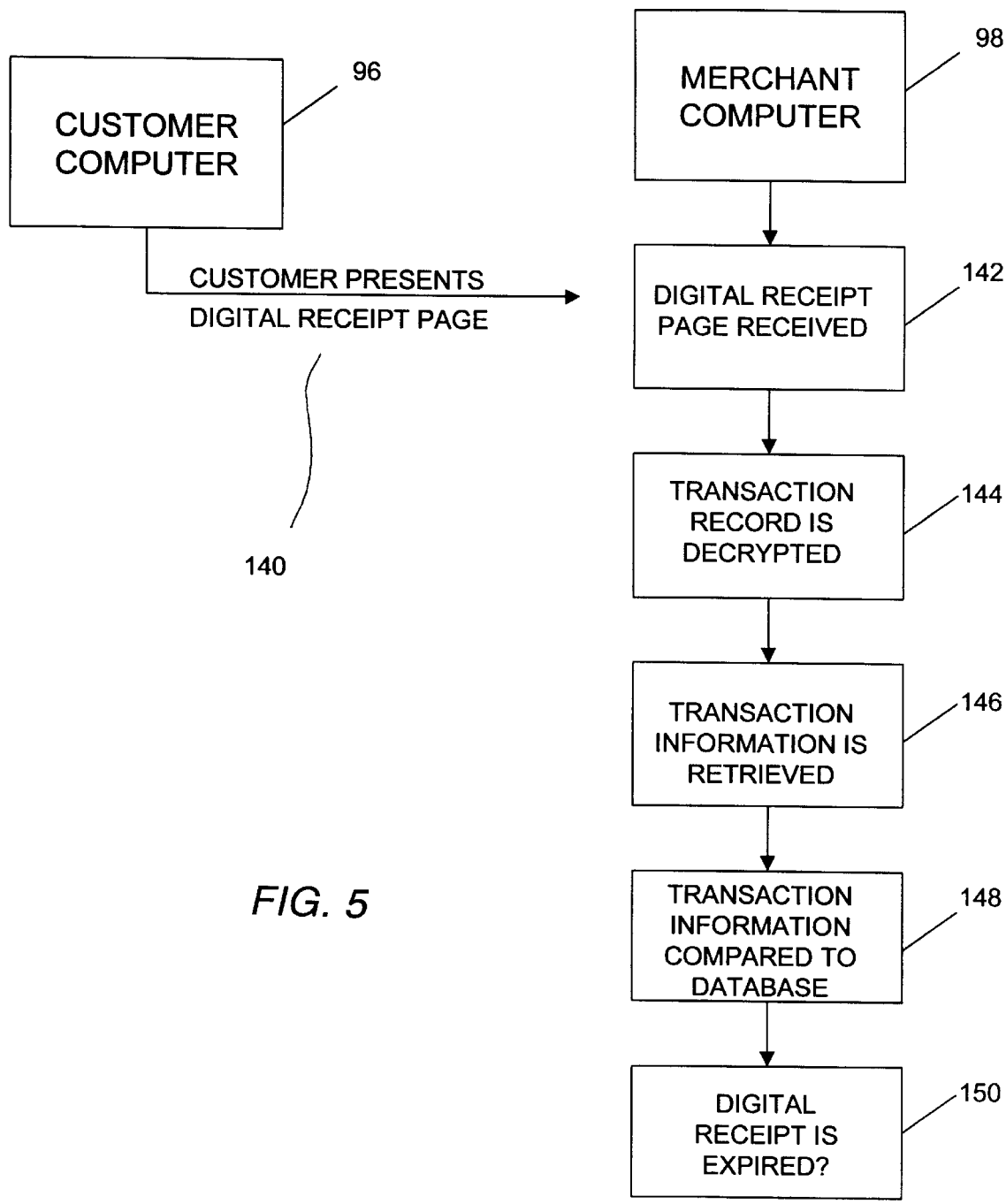
FIG. 5 is a flow chart showing steps for transmitting a digital receipt back to a merchant and decrypting by a merchant according to the invention.

Shown in FIG. 5 is an example of how a customer may present the digital receipt back to the merchant for authentication of the transaction. The customer may wish to present the digital receipt to the merchant in the event of a dispute with the merchant, but in general the customer may do so whenever he wishes to verify that a particular transaction took place. For example, a customer may present digital receipts to the merchant to verify that he is entitled to certain volume-based discounts.

In step 140, the customer presents a digital receipt page to the merchant computer. In step 142 the digital receipt page is received by the merchant computer. Note that although the merchant computer is shown in FIG. 5 as being the same merchant computer as in FIG. 1, in general the digital receipt may be received by any computer so authorized by the merchant.

In steps 144 and 146, the transaction record is decrypted by the merchant computer and the transaction information is extracted. Note that, of course, the method of decryption will depend on the method used for encryption in step 115 of FIG. 1. Since the transaction record was originally encrypted under the direction of the merchant, the merchant computer simply uses the same private key to extract the transaction data. In the case where digital signature techniques are used, the validity of the digital signature may be verified in the following manner. First, the signature is decrypted to extract the signature data. The signature data may then be compared with data obtained by applying the predetermined hash function to the appended confirmation message.

In step 148, the transaction information retrieved from decrypting the receipt code appended to the confirmation message is compared to information previously stored on the database in step 114. If the information corresponds sufficiently to the information on the confirmation message, then the digital receipt is verified. In the case where the transaction record simply consists of a confirmation number, then the extracted confirmation number is used to access transaction data stored on the database which, in turn, is compared with the transaction data on the confirmation message.

In step 150 the digital receipt may be checked for expiration. According to the preferred embodiment, the digital receipts are considered valid by the merchant for only a limited time. Such a time limit may be advantageous to the merchant since the merchant may wish to limit its liability to transactions made within a certain length of time. Additionally, all encryption systems have some risk of compromise which generally increases over time. Thus, depending on the type of transaction and the type of encryption used, the merchant may wish to guarantee digital receipts only for a limited time. For the sale of goods, for example, a merchant may wish to honor digital receipts only for 60 days from the date of the transaction.

In this way, according to the invention, the merchant is able to verify a digital receipt presented by a customer. The merchant advantageously is able to trust that a particular transaction took place, and further, that particular information such as price, quantity, and exact time of transaction are accurately reflected on the confirmation message. A valuable result of the relatively high level of trust afforded to the merchant by the present invention is that the merchant thereby is able to guarantee to the customer that the digital receipt issued to the customer will be honored as proof of the transaction. Thus, in addition to the benefits to the merchant, the present invention provides an unexpected benefit to the customer in that it allows merchants to guarantee issued digital receipts.

While preferred embodiments of the invention have been described, the descriptions are merely illustrative and are not intended to limit the present invention. For example it is to be understood that although the invention was described in the context of electronic transactions such as those for the purchase of goods or the trading of stocks, the invention is also applicable to many other types of transactions. Additionally, although the invention was described in the context of transactions over the World Wide Web, the invention is applicable to transactions carried out in other networked computer environments.

What is claimed is:

1. A method of authenticating an electronic transaction between a first party to the transaction and a second party to the transaction comprising the steps of:

conducting an electronic transaction over a public electronic network between a computer of the first party and a computer of the second party;

creating a transaction record comprising information identifying the electronic transaction to the first party;

encrypting the transaction record such that a computer of the first party may decrypt the transaction record and such that decryption of the transaction record by computers of those other than the first party is prevented; and communicating over the public electronic network the encrypted transaction record from a computer of the first party to a computer of the second party.

2. The method of claim 1 wherein the step of encrypting further comprises encrypting the transaction record using a DES encryption algorithm.

3. The method of claim 1 wherein the step of conducting an electronic transaction is facilitated over the Internet.

4. The method of claim 1 further comprising the step of causing a computer process of the second party to remain inactive until the encrypted transaction record is communicated to the computer process.

5. The method of claim 1 wherein the transaction record comprises a confirmation number, the confirmation number uniquely identifying the electronic transaction.

6. The method of claim 1 wherein the transaction record comprises the identity of the second party and the time the transaction took place.

7. The method of claim 5 further comprising the steps of:

creating with a computer of the first party a plaintext message comprising a description of the transaction; and appending the encrypted transaction record to the plaintext message to form a digital receipt, and wherein said step of communicating comprises communicating to the second party the digital receipt.

8. The method of claim 7 wherein the transaction record comprises a description of the transaction and the transaction record is stored on a database.

9. The method of claim 8 further comprising the steps of:

receiving from a computer of the second party the encrypted transaction record;

decrypting with a computer of the first party the encrypted transaction record; and comparing the decrypted transaction record with the transaction record stored on the database.

10. The method of claim 1 wherein the first party is a merchant and the second party is a customer.

11. The method of claim 1 wherein the first party is a financial institution and the second party is a customer.

12. A method of authenticating an electronic transaction between a first party to the transaction and a second party to the transaction comprising the steps of:

conducting an electronic transaction over a public electronic network between a computer of the first party and a computer of the second party;

creating a transaction record, the transaction record comprising information which identifies the electronic transaction to a computer of the first party;

encrypting the transaction record such that a computer of the first party may decrypt the transaction record and such that a computer of the second party may not decrypt the transaction record;

creating with the first party a plaintext message comprising a description of the transaction;

appending the encrypted transaction record to the plaintext message to form a digital receipt;

communicating the digital receipt to the second party such that a computer process under the control of the second party may receive the digital receipt; and causing the computer process under the control of the second party to remain inactive until the digital receipt is communicated to said computer process.

13. An apparatus for authenticating an electronic transaction between a first party to the transaction and a second party to the transaction comprising:

a network access device operatively connected to a public electronic network and adapted to facilitate electronic transactions over the public electronic network;

a first computer directed by the first party and operatively connected to said network access device such that said first computer is in transactional communication with a second computer over the public electronic network, said first computer configured and adapted to create a transaction record identifying to the first party a transaction conducted over the public electronic network;

an encryptor operatively connected to said first computer, said encryptor adapted to encrypt the transaction record such that decryption of the transaction record by computers of those other than the first party is prevented, and wherein said first computer communicates a transaction record encrypted by said encryptor to the second computer via the public electronic network.

14. The apparatus of claim 13 wherein the public electronic network is the Internet.

15. The apparatus of claim 14 wherein the encryptor is adapted to encrypt the transaction record using a DES encryption algorithm.

16. The apparatus of claim 15 wherein said first computer causes the second computer to remain inactive prior to receipt of an encrypted transaction record.

17. The apparatus of claim 13 further comprising a database in communication with said first computer and adapted to store the transaction record.

18. The apparatus of claim 17 further comprising;
   a decryptor operatively connected to said first computer and adapted to decrypt a transaction record encrypted by said encryptor; and
   a comparator operatively connected to said first computer and adapted to compare the decrypted transaction record with a transaction record stored on the database.

19. A computer-readable medium which can be used to direct a computer to authenticate an electronic transaction between a first party to the transaction and second party to the transaction comprising:
   means for directing a computer of the first party to conduct an electronic transaction with a computer of a second party over a public electronic network;
   means for directing the computer of the first party to create a transaction record identifying an electronic transaction between the first party and the second party;
   means for directing the computer of the first party to encrypt the transaction record such that a computer of the first party may decrypt the transaction record and such that decryption of the transaction record by computers of those other than the first party is prevented; and
   means for directing the computer of the first party to communicate the encrypted transaction record to the computer of the second party.

20. The computer-readable medium of claim 19 further comprising means for directing the computer of the first party to cause the computer of the second party to remain inactive until the encrypted transaction record is received, and wherein the public electronic network is the Internet.

21. The computer-readable medium of claim 20 further comprising:
   means for directing the computer of the first party to create a plaintext message comprising a description of the transaction;
   means for directing the computer of the first party to append the encrypted transaction record to the plaintext message to form a digital receipt, wherein the transaction record comprises a description of the transaction and is stored on a database.

22. The computer-readable medium of claim 21 wherein said means for directing the computer of the first party to encrypt comprises means for directing the computer of the first party to encrypt the transaction record using a DES encryption algorithm.

23. The computer-readable medium of claim 21 further comprising:
   means for directing the computer of the first party to receive from the computer of the second party the encrypted transaction record;
   means for directing the computer of the first party to decrypt the encrypted transaction record by a computer of the first party; and
   means for directing the computer of the first party to compare the decrypted transaction record with the transaction record stored on the database.

* * * * *